June 15, 1948. R. R. ROOT 2,443,584
DUSTING DEVICE
Filed Feb. 24, 1944
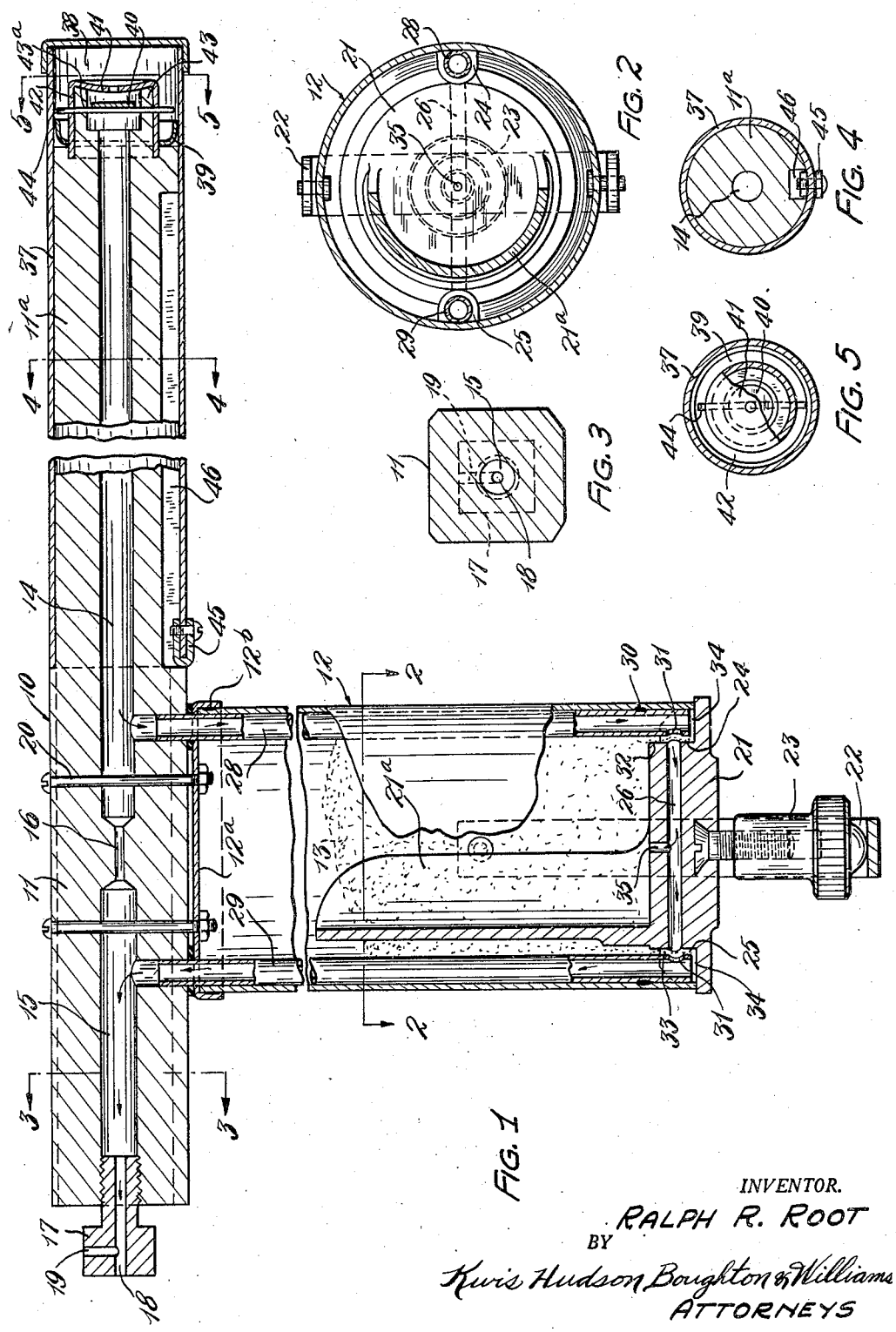
INVENTOR.
RALPH R. ROOT
BY
Kwis Hudson, Boughton & Williams
ATTORNEYS Patented June 15, 1948

2,443,584

UNITED STATES PATENT OFFICE 2,443,584

DUSTING DEVICE

Ralph R. Root, Lakewood, Ohio, assignor, by mesne assignments, to Naco Manufacturing Company, Huntington Park, Calif., a corporation of California Application February 24, 1944, Serial No. 523,651

4 Claims. (Cl. 43—147)

This invention relates to devices for distributing insecticide and fungicide materials and aims to provide an improved device of this kind which is of a simple and economical construction but which is efficient and reliable and can be manually carried and operated.

Another object of this invention is to provide an improved manually portable duster having a rigid handle member and a dust container depending therefrom and wherein the air for distributing the dust is effectively supplied through said handle member.

A further object of the invention is to provide an improved duster in which the rigid handle member has air inlet and delivery passages and wherein one portion of the air supply follows a circuitous path through the dust container and another portion is supplied directly to said delivery passage.

Still another object is to provide an improved duster of this kind in which the air supply means includes a cylinder barrel surrounding a portion of the rigid handle member and cooperating therewith to form an air pump.

The invention can be further briefly summarized as consisting in certain novel combinations and arrangements of parts hereinafter described and particularly set out in the appended claims.

In the accompanying sheet of drawings,

Fig. 1 is a longitudinal sectional view taken through an insecticide distributing device constructed according to the present invention;

Fig. 2 is a transverse sectional view thereof taken on line 2—2 of Fig. 1;

Fig. 3 is a transverse sectional view taken through the handle member on line 3—3 of Fig. 1; and Figs. 4 and 5 are transverse sectional views taken through the air pump on lines 4—4 and 5—5, respectively, of Fig. 1.

In the embodiment of the invention illustrated in the drawings I show an insecticide distributing device 10 comprising an elongated body or handle member 11, and a container 12 connected with and depending from said body and adapted to contain a supply of insecticide and/or fungicide material 13, preferably in the form of dust.

The elongated body or handle member 11 is a rigid member made of wood, plastic or other suitable inexpensive material, and has coaxial longitudinal air passages 14 and 15 therein which are connected by a relatively restricted passage 16. The passage 14 is an air inlet passage to which air under pressure is supplied for causing the insecticide material 13 to be mixed with air and delivered in the desired manner. The passage 15 is a delivery passage through which the mixture of air and insecticide material is discharged from the device.

The body 11 is provided at its outer or forward end with a nozzle member or fitting 17 having straight and angular openings 18 and 19 for directing the air and insecticide mixture in a stream in the desired direction. The opening 18 extends axially of the body 11 and serves to direct the mixture in a substantially straight or forward direction. The opening 19 is used for directing the mixture in an upward direction and is convenient for applying such mixture to the undersurfaces of plant foliage. When it is desired to deliver the stream through the opening 19, the opening 18 is closed as by the operator placing a finger over the end of this opening. When both of the openings 18 and 19 are left uncovered, the mixture is discharged only through the opening 18.

The container 12 is here shown in the form of a cylindrical can or tank extending in depending relation from the body 11 and having its upper end wall 12a connected with the latter as by means of the screws 20. The body of the container is preferably cylindrical and is permanently connected with its end wall 12a as by means of the solder 12b. The lower end of the container has a removable cover 21 formed of plastic or other suitable material and adapted to be removably connected with the container by means of a pivoted bail or strap 22 and a locking nut 23 which is carried by the cover and cooperates with the bail when the latter is in its cover-retaining position. The cover 21 is preferably constructed with a curved integral extension 21a which serves as a scoop for use in filling the container 12 with the insecticide material 13. The cover 21 also has a pair of substantially diametrically opposed recesses 24 and 25 formed therein and a transverse passage 26 connecting such recesses. The purpose of these recesses and passage will be presently explained.

As mentioned above air under pressure is supplied to the inlet passage 14 for operating the device. A portion of this air is passed through the container 12 along a circuitous path for mixing with the insecticide material 13, and the air and insecticide mixture is then discharged through the delivery passage 15 and the nozzle 17. Another portion of the air is discharged directly from the inlet passage 14 through the relatively restricted passage 16 into the delivery passage 15. This portion of the air provides a direct blast through the delivery passage and nozzle which serves to produce a more complete atomization or distribution of the dust particles in the air stream. This blast also causes the mixture to be delivered from the nozzle 17 in a high velocity stream which will travel and carry the dust particles for a substantial distance in the direction in which it is desired to be projected. The by-passing of a portion of the air supply through the passage 16 also acts as a regulating means which prevents an excessive amount of the material 13 from being discharged from the container 12 as would occur if all of the air were passed through the container.

For obtaining the above-mentioned circuitous flow of air through the container 12, I provide a pair of tubes 28 and 29 which project from the body 11 and extend downwardly into the container 12 to a point adjacent the lower end thereof. The tube 28 forms an extension of the air inlet passage 14 and the tube 29 forms an extension of the delivery passage 15. These tubes are preferably attached to the side wall of the container 12, as by means of the solder 30, and are located at substantially diametrically opposed points so that their lower ends will extend, respectively, into the recesses 24 and 25 of the cover 21 when the latter is applied to the container.

Adjacent their lower ends the tubes 28 and 29 have lateral openings 31 disposed substantially opposite the ends of the transverse passage 26 of the cover 21. The tubes 28 and 29 are somewhat smaller in size than the recesses 24 and 25 so that spaces 32 and 33 are left between the tubes and cover through which the material 13 can pass downwardly to the lateral openings 31. The length of the tubes 28 and 29 is preferably such that their lower ends are separated from the cover 21 by intervening spaces 34 with which the passages of the tubes communicate.

The portion of the air supply which flows downwardly through the tube 28 is discharged laterally from the opening 31 and through the passage 26 of the cover 21 into the tube 29 through the opening 31 of the latter. As the air passes from the tube 28 into the passage 26 and from this passage into the tube 29, it picks up dust from the spaces 32 and 33 and such dust becomes entrained and diffused in the air stream. The air and dust mixture flows upwardly through the tube 29 to the delivery passage 15 from which it is discharged in the manner above explained. It should also be explained at this point that the velocity discharge of air through the passage 16 into the delivery passage 15 flows across the upper end of the tube 29 and tends to draw or facilitate the flow of the mixture upwardly in the latter.

The supply of material 13 in the container 12 can be maintained in a loose and free-flowing condition by providing one or more openings 35 in the cover 21 which discharge air from the passage 26 upwardly through such material. The spaces 34 at the ends of the tubes 28 and 29 also permit the discharge of some air from the tubes at these points which assists in keeping the material adjacent the tubes in a loose and free-flowing condition.

The air which is supplied under pressure to the inlet passage 14 is, in this instance, obtained from a manually operated pump comprising a substantially cylindrical portion or extension 11*a* of the handle member or body 11 and a cylinder barrel 37 surrounding such extension. The extension 11*a* forms a piston or plunger with which the cylinder barrel 37 cooperates to define a pump chamber 38. A flexible cup-shaped packing 39 carried by the outer end of the extension 11*a* cooperates with the inner surface of the barrel 37, so that during relative reciprocation between such barrel and the extension air will be compressed in the pump chamber 38 and forced into the inlet passage 14.

A check valve in the form of a disk 40 controls the inlet passage 14 and is opened by movement in a direction toward the container 12 and away from a valve seat 41 formed by the transverse wall of a cup-member 42. The latter member is mounted on a relatively reduced portion 43 of the extension 11*a* and is retained thereon by the transverse pin 44. This pin also retains the valve disk 40 in adjacent relation to the valve seat 41 and limits the extent of movement of the valve away from its seat.

Removal of the cylinder barrel 37 from the extension 11*a* is prevented during the normal operation of the device by a lug 45 mounted on the inner end of the cylinder barrel and operable in a longitudinal groove 46 formed in the extension. The ends of the groove form stops adapted to be engaged by the lug for limiting the travel of the cylinder barrel.

From the foregoing description and the accompanying drawing it will now be readily understood that I have provided an improved form of insecticide distributing device which can be very economically manufactured. It will also be seen that the improved device is manually portable, easy to operate, and is very effective and reliable for distributing insecticide and fungicide materials for application to vegetation or for various other purposes.

While I have illustrated and described my improved device in considerable detail, it will be understood, of course, that I do not wish to be correspondingly limited but regard my invention as including all changes and modifications coming within the scope of the appended claims.

Having thus described my invention, I claim:

1. In a duster, a body having inlet and delivery passages, means for supplying air under pressure to said inlet passage, a container attached to said body and adapted to contain a supply of dust, a bottom wall for closing the lower end of said container, a pair of tubes connected with said inlet and delivery passages and extending into the container with their lower ends adjacent the bottom walls of said container, and means on said bottom wall providing an air and dust mixing passage connecting the lower ends of said tubes.

2. In a duster, a body having inlet and delivery passages, means for supplying air under pressure to said inlet passage, a container attached to said body and adapted to contain a supply of dust, a pair of tubes connected with said inlet and delivery passages and extending into the container with their lower ends adjacent the bottom of said container, said tubes having substantially opposed lateral openings adjacen their lower ends, and a closure for the lower end of the container having a portion extending upwardly between the tubes and provided with a passage connecting said lateral openings, said tubes and closure having space therebetween to permit dust to enter the last mentioned passage.

3. A manually portable and operable duster comprising an elongated substantially straight rigid body which includes a handle portion adapted to be grasped for manually manipulating the device and a plunger portion, a container attached to and depending from said body and adapted to contain a supply of dust, said body being solid except for an opening extending axially therethrough and which includes an inlet passage for air under pressure and a discharge passage for a dust and air mixture, conduit means connecting said container with said discharge passage for supplying the dust and air mixture to the latter from said container, conduit means connected with said inlet passage and communicating with said container adjacent the bottom thereof for supplying air under pressure thereto, a pump cylinder surrounding said plunger portion and reciprocable thereon, said cylinder and plunger portion defining a pump pressure chamber connected with said inlet passage, and a check valve in said inlet passage and being operable to open in a direction toward said container.

4. A manually portable and operable duster comprising an elongated substantially straight rigid body which includes a handle portion adapted to be grasped for manually manipulating the device and a plunger portion, a container attached to and depending from said body and adapted to contain a supply of dust, said body being solid except for an opening extending axially therethrough and which includes an inlet passage for air under pressure, a discharge passage for a dust and air mixture and a permanently open relatively restricted passage connecting said inlet and discharge passages, conduit means connecting said container with said discharge passage for supplying the dust and air mixture to the latter from said container, conduit means connected with said inlet passage and communicating with said container adjacent the bottom thereof for supplying air under pressure thereto, said restricted passage being located between the two conduit means leading into and out of said container, a pump cylinder surrounding said plunger portion and reciprocable thereon, said cylinder and plunger portion defining a pump pressure chamber connected with said inlet passage, and a check valve in said inlet passage and being operable to open in a direction toward said container.

RALPH R. ROOT.

REFERENCES CITED

The following references are of record in the file of this patent:

UNITED STATES PATENTS

| Number | Name | Date |
| --- | --- | --- |
| 1,207,794 | Reddy | Dec. 12, 1916 |
| 1,536,352 | Murray | May 5, 1925 |
| 1,712,804 | Wytcherley | May 14, 1929 |
| 1,769,904 | Bageley | July 1, 1930 |
| 1,837,136 | Roberts | Dec. 15, 1931 |
| 2,068,871 | Rose | Jan. 26, 1937 |
| 2,086,696 | Brandt | July 13, 1937 |
| 2,208,853 | Oys | July 23, 1940 |
| 2,219,208 | Knight | Oct. 12, 1940 |
| 2,226,013 | Oys | Dec. 24, 1940 |

FOREIGN PATENTS

| Number | Country | Date |
| --- | --- | --- |
| 835,761 | France | Oct. 3, 1938 |